United States Patent
Lemarinier et al.

(10) Patent No.: US 9,448,842 B1
(45) Date of Patent: Sep. 20, 2016

(54) SELECTING AND RESIZING CURRENTLY EXECUTING JOB TO ACCOMMODATE EXECUTION OF ANOTHER JOB

(71) Applicant: International Business Machines Corporation, Armonk, NY (US)

(72) Inventors: Pierre Lemarinier, Leixlip (IE); Srikumar Venugopal, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/010,079

(22) Filed: Jan. 29, 2016

(51) Int. Cl.
G06F 9/455 (2006.01)
G06F 9/46 (2006.01)
G06F 9/50 (2006.01)

(52) U.S. Cl.
CPC ................... G06F 9/50 (2013.01)

(58) Field of Classification Search
None
See application file for complete search history.

(56) References Cited

U.S. PATENT DOCUMENTS

| | | | |
|---|---|---|---|
| 7,926,057 B2 | 4/2011 | Chan et al. | |
| 8,813,088 B2 | 8/2014 | Balmin et al. | |
| 2009/0025004 A1* | 1/2009 | Barnard | G06F 9/50 718/104 |
| 2010/0293549 A1* | 11/2010 | Brelsford | G06F 9/5066 718/104 |
| 2015/0074681 A1 | 3/2015 | Hildrum et al. | |

OTHER PUBLICATIONS

G. Martin, D. E Singh, M.-C. Marinescu, and J. Carretero, "Enhancing the performance of malleable MPI applications by using performance-aware dynamic reconfiguration," Parallel Computing, vol. 46, pp. 60-77, Jul. 2015.
J. Buisson, O. Sonmez, H. Mohamed, W. Lammers, and D. Epema, "Scheduling malleable applications in multicluster systems," in 2007 IEEE International Conference on Cluster Computing, pp. 372-381.
K. El Maghraoui, T. J. Desell, B. K. Szymanski, and C. A. Varela, "Malleable Iterative MPI Applications," Concurr. Comput.□: Pract. Exper., vol. 21, No. 3, pp. 393-413, Mar. 2009.
R. Sudarsan and C. J. Ribbens, "ReSHAPE: A Framework for Dynamic Resizing and Scheduling of Homogeneous Applications in a Parallel Environment," in International Conference on Parallel Processing, 2007 (ICPP 2007), Sep. 10-14, 2007, pp. 44-44.
R. Sudarsan and C. J. Ribbens, "Scheduling resizable parallel applications," in IEEE International Symposium on Parallel Distributed Processing, 2009 (IPDPS 2009), May 23-29, 2009, pp. 1-10.

* cited by examiner

*Primary Examiner* — Eric C Wai
*Assistant Examiner* — James J Lee
(74) *Attorney, Agent, or Firm* — Cantor Colburn LLP; Kurt Goudy

(57) ABSTRACT

A job execution scheduling system and associated methods are provided for accommodating a request for additional computing resources to execute a job that is currently being executed or a request for computing resources to execute a new job. The job execution scheduling system may utilize a decision function to determine one or more currently executing jobs to select for resizing. Resizing a currently executing job may include de-allocating one or more computing resources from the currently executing job and allocating the de-allocated resources to the job for which the request was received. In this manner, the request for additional computing resources is accommodated, while at the same time, the one or more jobs from which computing resources were de-allocated continue to be executed using a reduced set of computing resources.

15 Claims, 9 Drawing Sheets

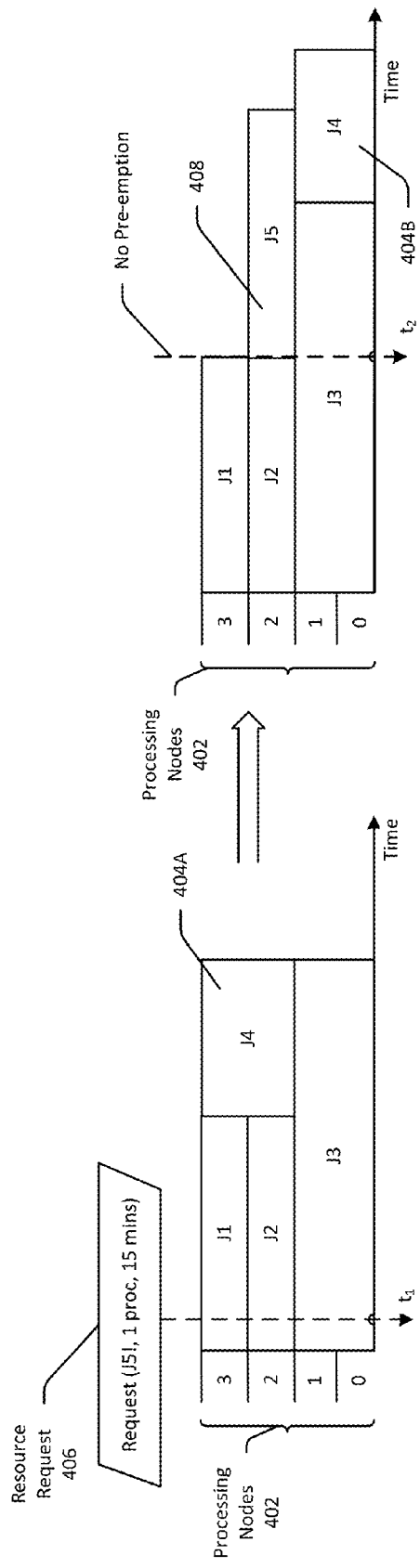
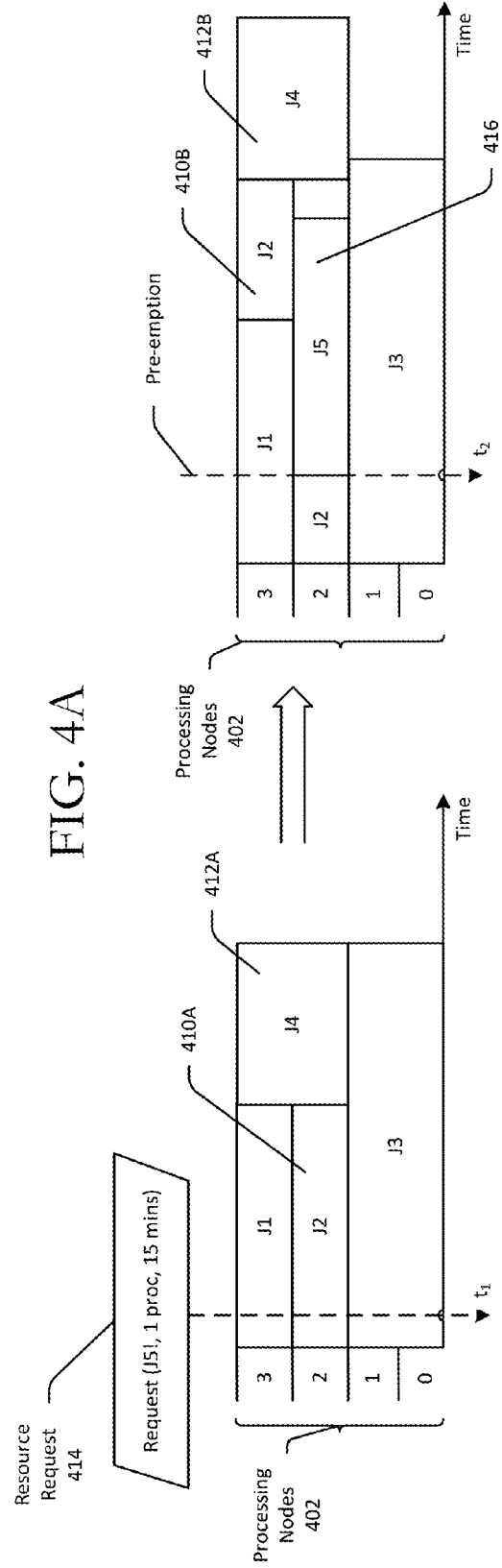
FIG. 4A
FIG. 4B

SELECTING AND RESIZING CURRENTLY EXECUTING JOB TO ACCOMMODATE EXECUTION OF ANOTHER JOB

BACKGROUND

Certain machine/computer-executable applications are capable of being executed in parallel by different processing resources. For example, a first portion of an application may execute on a first processing resource at least partially concurrently with execution of a second portion of the application on a second processing resource. A resource manager may be configured to allocate a set of processing resources to collectively execute an application. Conventional resource managers suffer from a number of drawbacks. Technical solutions that address at least some of the drawbacks associated with conventional resource managers are described herein.

SUMMARY

In one or more example embodiments of the disclosure, a method for scheduling execution of parallel or distributed applications is disclosed that includes receiving, by a scheduling system comprising one or more computer processors, a request to allocate a set of one or more computing resources for execution of a first executable application; selecting, by the scheduling system, a second executable application to resize to accommodate the request to allocate the set of one or more computing resources, wherein at least a portion of the second executable application is currently executing on a first computing resource of the set of one or more computing resources; causing, by the scheduling system, the second executable application to be resized at least in part by sending a first signal to the first computing resource to cease execution of the at least a portion of the second executable application on the first computing resource; and sending, by the scheduling system, a second signal to the first computing resource to initiate execution of at least a portion of the first executable application on the first computing resource.

In one or more other example embodiments of the disclosure, a system for scheduling execution of parallel or distributed application is disclosed that includes at least one memory storing computer-executable instructions; and at least one processor configured to access the at least one memory and execute the computer-executable instructions to: receive a request to allocate a set of one or more computing resources for execution of a first executable application; select a second executable application to resize to accommodate the request to allocate the set of one or more computing resources, wherein at least a portion of the second executable application is currently executing on a first computing resource of the set of one or more computing resources; cause the second executable application to be resized at least in part by sending a first signal to the first computing resource to cease execution of the at least a portion of the second executable application on the first computing resource; and send a second signal to the first computing resource to initiate execution of at least a portion of the first executable application on the first computing resource.

In one or more other example embodiments of the disclosure, a computer program product for scheduling execution of parallel or distributed applications is disclosed that comprises a non-transitory storage medium readable by a processing circuit, the storage medium storing instructions executable by the processing circuit to cause a method to be performed, the method comprising: receiving a request to allocate a set of one or more computing resources for execution of a first executable application; selecting a second executable application to resize to accommodate the request to allocate the set of one or more computing resources, wherein at least a portion of the second executable application is currently executing on a first computing resource of the set of one or more computing resources; causing the second executable application to be resized at least in part by sending a first signal to the first computing resource to cease execution of the at least a portion of the second executable application on the first computing resource; and sending a second signal to the first computing resource to initiate execution of at least a portion of the first executable application on the first computing resource.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 4A schematically depicts delayed execution of a scheduled job to accommodate a request to execute a new high-priority job.

FIG. 4B schematically depicts preemption of a currently executing job using checkpointing in order to accommodate a request to execute a new high-priority job.

DETAILED DESCRIPTION

Figure 1:
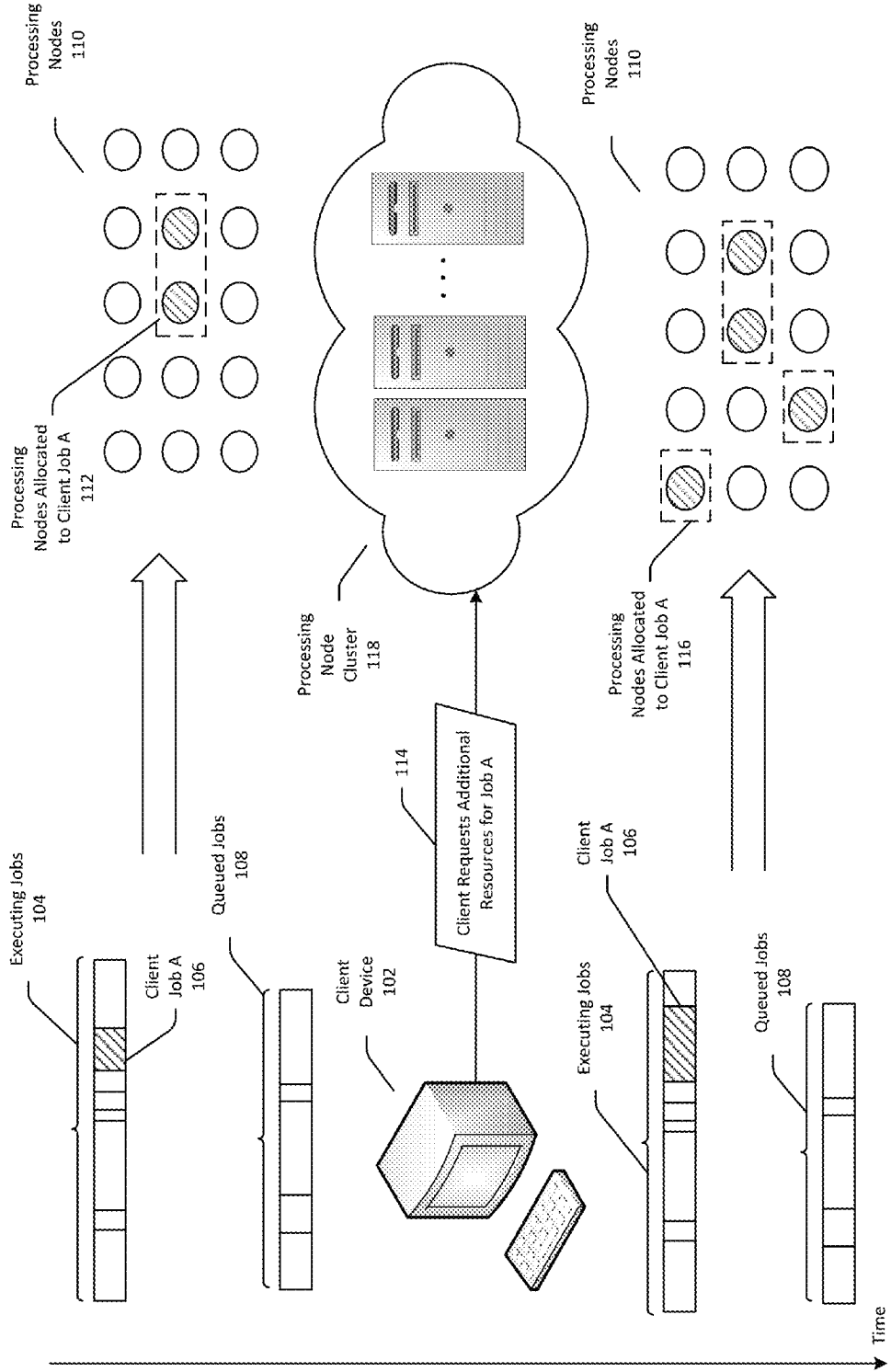
FIG. 1 schematically depicts allocation of additional processing nodes for execution of a job in response to receipt of a request for additional computing resources in accordance with one or more example embodiments of the disclosure.

Example embodiments of the disclosure include, among other things, systems, methods, computer-readable media, techniques, and methodologies for accommodating a request for additional computing resources to execute a job that is currently being executed or a request for computing resources to execute a new job by de-allocating one or more computing resources from one or more jobs that are currently executing and re-allocating the de-allocated computing resources to the job associated with the received request, while at the same time, continuing to execute the one or more jobs from which computing resource(s) were de-allocated using a set of reduced computing resources. As used herein, a job may include, without limitation, a machine/computer-executable application, a machine/computer-executable process, a thread, or any collection of machine/computer-executable instructions. A processing node may be any suitable processing unit including, without limitation, a processing circuit with multiple processors/processing cores, a single-core processor, or the like. Further, as used herein, a computing resource may refer to a processing node or additional execution time on a processing node.

More specifically, in certain example embodiments of the disclosure, a client device may request additional computing resources for a job that is currently being executed on one or more processing nodes. A job execution scheduling system in accordance with example embodiments of the disclosure may utilize a decision function to determine one or more currently executing jobs to select for resizing. Resizing a currently executing job may include, for example, de-allocating one or more computing resources from the currently executing job. The de-allocated resources may then be allocated to the job for which the request was received. For example, for a first job that is executing concurrently on first and second processing nodes, the first job may be resized by ceasing execution of a portion of the first job that is executing on the first processing node such that execution of at least a portion of a second job for which additional computing resources were requested can be initiated on the first processing node. In this manner, the request for computing resources for the second job can be accommodated, while at the same time, execution of the first job can continue on the second processing node. The resizing of a job may result in a longer execution time for the job. Thus, in certain example embodiments, jobs selected for resizing may be those for which the difference between remaining execution time prior to resizing and the remaining execution time after resizing is minimized.

In addition, in certain example embodiments, a client device may request computing resources for a new job that is not currently being executed. The new job may be, for example, a high-priority job having an assigned priority that is greater than the respective priorities of one or more other jobs that are currently executing. Using a decision function, a currently executing job having a lower priority than the new job may be selected for resizing to accommodate execution of the new job.

A job execution scheduling system in accordance with example embodiments of the disclosure eliminates a number of drawbacks associated with conventional computing resource managers. Conventional resource managers manage, for example, execution of tightly coupled applications that have a high level of interdependence between constituent processes (e.g., message passing interface (MPI) applications) and/or distributed applications (e.g., MapReduce—which is a programming model and associated implementation for processing and generating large datasets with a parallel, distributed algorithm on a cluster) by allocating, for each application in an application queue, a respective set of computing resources for execution of the application. With conventional resource managers, once a set of resources has been allocated to an application, and execution of the application has been initiated using the set of resources, modifications to the set of resources are not permitted during execution of the application.

As such, in conventional resource management, two types of approaches may be taken if computing resources that have already been allocated are requested (e.g., by a currently executing job or a new job). Under one approach, the requested resources are not allocated to the requesting job until execution of an application currently using the requested resources is complete. Under the other approach, the application that is currently using the requested resources is preempted (e.g., execution of the application is completely halted on the requested resources), and the requested resources are instead allocated to the requesting job.

In contrast, in accordance with example embodiments of the disclosure, a request for additional computing resources for a currently executing job or an urgent request to execute a new job (e.g., a high-priority job) can be accommodated without requiring the requesting job to wait until computing resources are available and without halting execution of any currently executing jobs. This is accomplished by selecting a currently executing job for resizing, resizing the selected job by de-allocating one or more computing resources from the selected job, and allocating the de-allocated computing resource(s) to the requesting job, while at the same time, continuing execution of the selected job on a reduced set of computing resources.

As previously noted, tightly coupled applications have a high level of interdependence between constituent processes. Thus, if execution of a particular process is halted or slows down, other processes are impacted. As a result, the processes of a tightly coupled application are managed as a unit. In contrast, loosely coupled applications involve a limited number of communications between constituent processes. Consequently, failure of a particular process of a loosely coupled application has a minimal effect on other processes and on execution of the application as a whole. Therefore, constituent processes of a loosely coupled application can be managed independently of each other. A job execution scheduling system in accordance with example embodiments of the disclosure provides the capability to manage the processes of a tightly coupled application, while still allowing those processes to be resized to accommodate requests for additional computing resources from other processes and/or requests to execute high-priority jobs. Conventional resource managers, on the other hand, do not permit modification to a set of computing resources allocated, for example, for execution of processes of a tightly coupled application, and thus, do not provide such a capability.

Additional technical advantages of a job execution scheduling system in accordance with example embodiments of the disclosure over conventional resource managers/scheduling systems include the capability to schedule execution of applications associated with different frameworks (e.g., tightly coupled applications, distributed analytic applications, etc.) concurrently; the capability to resize an application to an arbitrary number of processors; the capability to resize an application while taking into account whether the application prioritizes data locality or processor locality; and so forth. In addition, a job execution scheduling system in accordance with example embodiments of the disclosure is configured to manage job execution for a distributed system, and thus, is configured handle issues that an operating system (OS)/scheduler for a single system is not such as, for example, node failure, synchronization of checkpoint intervals, staleness of load information about nodes, distributed cache effects, rack aware scheduling, or the like.

FIG. 1 schematically depicts allocation of additional processing nodes for execution of a job in response to receipt of a request for additional computing resources in accordance with one or more example embodiments of the disclosure. FIG. 1 depicts a set of executing jobs 104 and a set of queued jobs 108. One or more of the executing jobs 104 and/or one or more of the queued jobs 108 may be associated with a client device 102 (e.g., requested by the client device 102). For example, the executing job 106 may be associated with the client device 102.

The client device 102 may be communicatively coupled to a processing node cluster 118. The processing node cluster 118 may include processing nodes 110. A respective set of one or more of the processing nodes 110 may be allocated for execution of each of the executing jobs 104. Further, a respective set of one or more of the processing nodes 110 may be scheduled for future execution of each of one or more of the queued jobs 108. For example, the executing job 106 may be currently executing on processing nodes 112 of the set of processing nodes 110.

At some point in time, the client device 102 may send a request 114 to the processing node cluster 118 for additional resources to execute job 106. The request 114 may include a request for one or more additional processing nodes and/or a request for additional execution time. A job execution scheduling system in accordance with example embodiments of the disclosure may accommodate the request 114 by allocating one or more additional processing nodes for execution of job 106. The request 114 may be accommodated by resizing one or more other executing jobs of the set of executing jobs 104. For example, two additional processing nodes may be de-allocated from one or more other executing jobs and re-allocated for execution of the executing job 106, resulting in an expanded set of processing nodes 116 now allocated for execution of the job 106.

Figure 2:
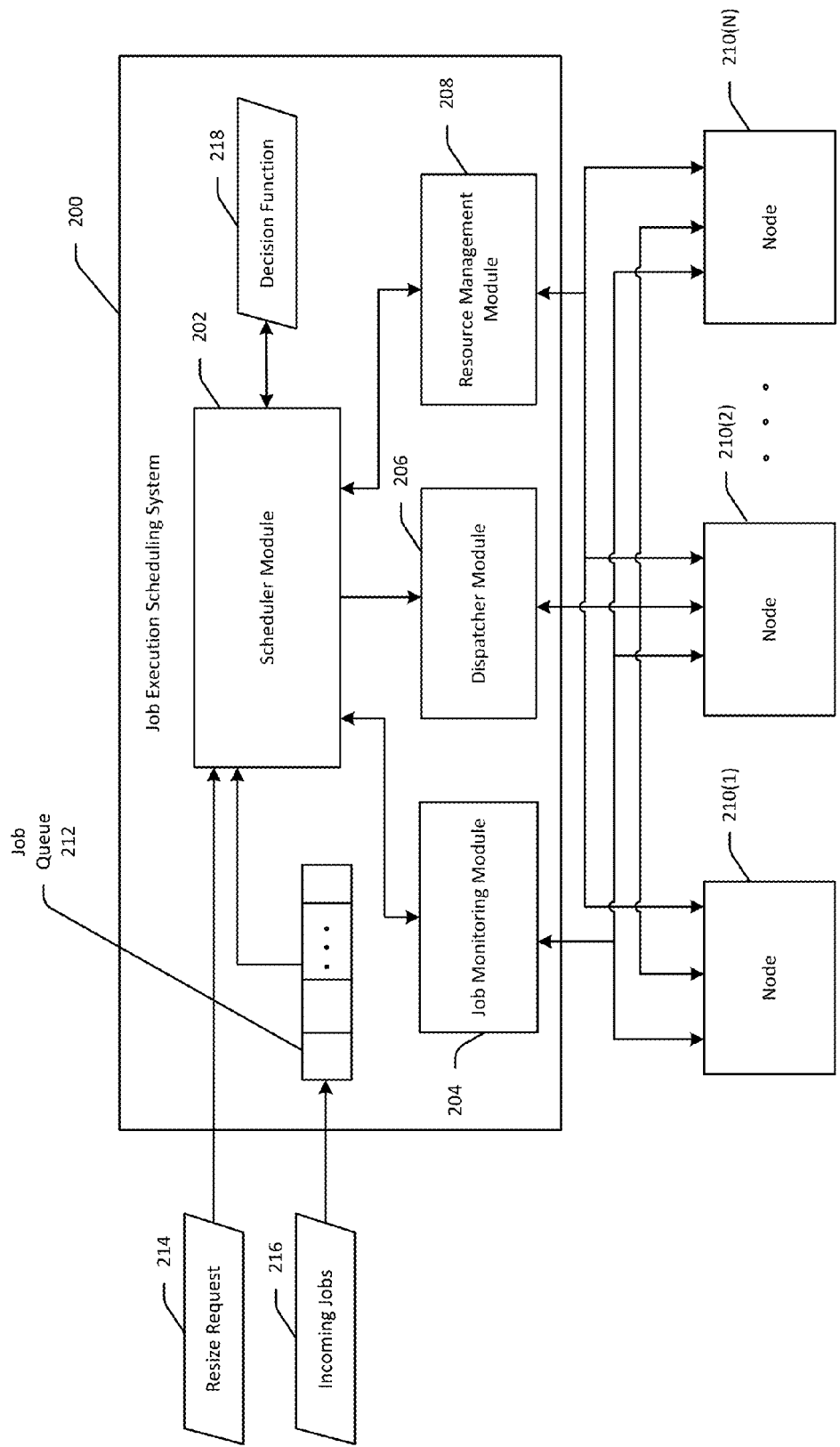
FIG. 2 schematically depicts an illustrative configuration of a job execution scheduling system and illustrative interaction with a set of processing nodes in accordance with one or more example embodiments of the disclosure.

FIG. 2 schematically depicts an illustrative configuration of a job execution scheduling system and illustrative interaction with a set of processing nodes in accordance with one or more example embodiments of the disclosure. The job execution scheduling system 200 may include various modules, each of which may be configured to perform one or more corresponding operations. For example, the job execution scheduling system 200 may include, without limitation, a scheduler module 202, a job monitoring module 204, a dispatcher module 206, and a resource management module 208. Each of the modules of the job execution scheduling system 200 may include computer-executable instructions, code, or the like that responsive to execution by one or more processing units (e.g., a processing circuit) cause corresponding operations to be performed.

The scheduler module 202 may, for example, include computer-executable instructions, code, or the like that responsive to execution by a processing circuit cause operations to be performed for accepting incoming jobs 216 and a resize request 214, utilizing a decision function 218 to select one or more executing jobs for resizing, and transmitting one or more resize commands (e.g., signals) to the dispatcher module 206.

The incoming jobs 216 may be placed, for example, in a job queue 212. The resize request 214 may be a request for additional computing resources for execution of a job that is currently being executed or may be a request to execute a new high-priority job (e.g., one of the incoming jobs 216). The dispatcher module 206 may be communicatively coupled to a set of processing nodes 210(1)-210(N) (N may be any integer greater than or equal to 1). Any of the processing node(s) 210(1)-210(N) may be referred to herein generically as processing node 210. Upon receiving a resize command from the scheduler module 202, computer-executable instructions, code, or the like of the dispatcher module 206 may be executed to communicate the resize command to the appropriate processing node 210. For example, processing nodes 210(1) and 210(2) may be currently executing job X. If the resize command indicates that processing node 210(1) should be made available to execute at least a portion of job Y (which may be another currently executing job or a new high-priority job), the dispatcher module 206 may send a signal to processing node 210(1) to cease execution of job X at a particular point in time and initiate execution of the at least a portion of job Y. Also, more generally, the dispatcher module 206 may be configured to relay commands received from the scheduler module 202 to appropriate processing nodes 210 to initiate execution of new jobs from the job queue 212, checkpoint currently executing jobs (e.g., completely halt execution of a job, save an execution state of the job, and reinitiate execution at a later point in time from the saved execution state potentially on one or more different processing nodes 210), and so forth.

Referring now to other illustrative components of the job execution scheduling system 200, each of the job monitoring module 204 and the resource management module 208 may also be communicatively coupled to the set of processing nodes 210(1)-210(N). The job monitoring module 204 may include computer-executable instructions, code, or the like that responsive to execution by a processing circuit may cause operations to be performed for monitoring the progress of jobs that are currently being executed on the set of processing nodes 210(1)-210(N). For example, the job monitoring module 204 may be configured to determine the remaining execution time for a job executing on one or more of the processing nodes 210(1)-210(N). The resource management module 208 may include computer-executable instructions, code, or the like that responsive to execution by a processing circuit may cause operations to be performed for tracking the health and utilization of the processing nodes 210(1)-210(N). For example, the resource management module 208 may track which processing node(s) 210 are being used to execute a particular job.

Figure 6:
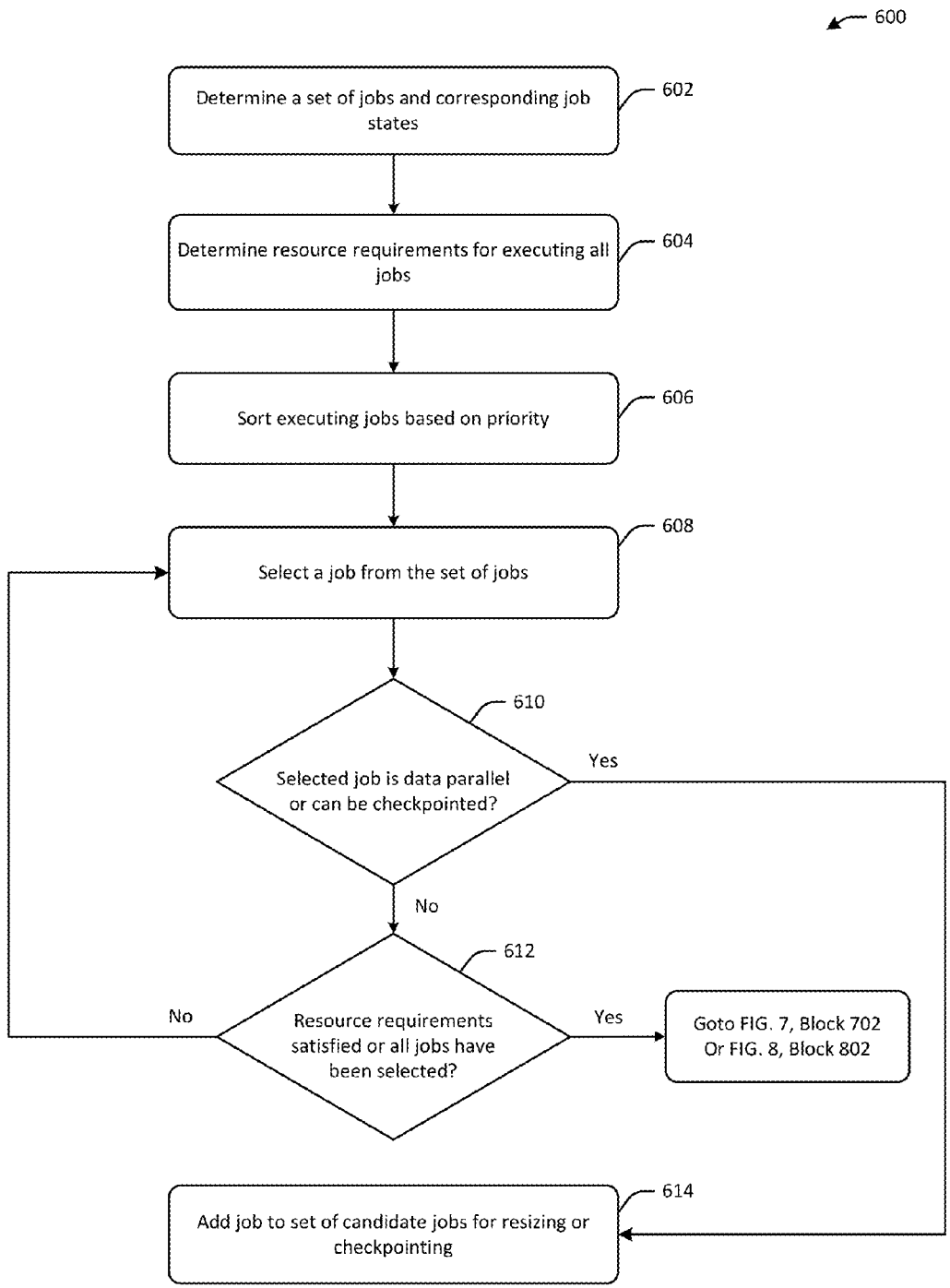
FIG. 6 is a process flow diagram of an illustrative method for determining a set of candidate jobs for resizing or checkpointing in accordance with one or more example embodiments of the disclosure.

FIG. 6 is a process flow diagram of an illustrative method 600 for determining a set of candidate jobs for resizing or checkpointing in accordance with one or more example embodiments of the disclosure. Prior to the resizing depicted in the example scenario of FIG. 3, the method 600 of FIG. 6 may be performed to determine a set of jobs that are candidates for resizing.

Referring to FIG. 6, at block 602, the job execution scheduling system 200 (or more specifically, for example, the scheduler module 202) may determine a set of jobs and corresponding job states. For example, the job execution scheduling system 200 may determine, for each job, whether the job is in a job queue and awaiting execution, whether the job is currently being executed (and if so, which processing node(s) the job is executing on), whether the job has been checkpointed, and so forth.

At block 604, the job execution scheduling system 200 may determine resource requirements for executing the set of jobs. For example, the job scheduling system 200 may determine, at block 604, the number of processing nodes and the execution time required to complete execution of each job including, for instance, jobs that currently being executed as well as jobs that in the job queue awaiting execution. At block 606, the job execution scheduling system 200 may sort currently executing jobs based on their respective execution priorities. For example, the job execution scheduling system 200 may order the currently executing jobs based on priority such that a least priority job that is eligible for resizing or checkpointing is selected for resizing or checkpointing first. In other example embodiments, the currently executing jobs may be ordered based differences between a current remaining execution time and a remaining execution time if the jobs are resized or checkpointed. In such example embodiments, a job for which the difference between the current remaining execution time and a remaining execution time if the job is resized or checkpointed is minimized may be selected first for resizing or checkpointing. In yet other example embodiments, both priority of a job and an execution time difference may be considered when sorting jobs.

Blocks 608-612 and 614 represent an iterative process that the job execution scheduling system 200 may perform to construct a set of candidate jobs for resizing or checkpointing. At block 608, the job execution scheduling system 200 may select a job from the set of jobs identified at block 602. At block 610, the job execution scheduling system 200 may determine whether the selected job is data parallel or can be checkpointed. Determining whether a job is data parallel may include determining whether the job is currently being executed on multiple processing nodes, and thus, whether the job is capable of being resized. Determining whether a job is capable of being checkpointed may include determining whether the execution of the job can be completely halted and resumed at a later point in time, potentially on one or more different processing nodes.

In response to a positive determination at block 610, the job execution scheduling system 200 may add the selected job to a set of candidate jobs for resizing or checkpointing at block 614. On the other hand, in response to a negative determination to block 610, the method 600 may proceed to block 612, where the job execution scheduling system 200 may determine whether resource requirements have been satisfied for all jobs or whether all jobs have been iterated through to determine candidacy for resizing or checkpointing. In response to a negative determination at block 612, the method 600 may again proceed to block 608, where another job may be selected. A negative determination may be made at block 612 if, for example, the resource requirements for at least one job have not been satisfied (e.g., processing node(s) need to be allocated for at least one job) or, even if the resource requirements for all jobs have not been satisfied, all jobs have been iterated through to determine their candidacy for resizing or checkpointing. In response to a positive determination at block 612, on the other hand, the method 600 may proceed to block 702 of FIG. 7 or block 802 of FIG. 8 depending on whether a request for computing resources is received from a currently executing job or from a new high-priority job.

It should be appreciated that what is obtained after performance of method 600 is a set of jobs that are candidates for resizing or checkpointing. The candidate jobs may be ordered in accordance with their execution priority, differences between pre-resizing and post-resizing execution times, differences between pre-checkpointing and post-checkpointing execution times, or any combination thereof.

Figure 3:
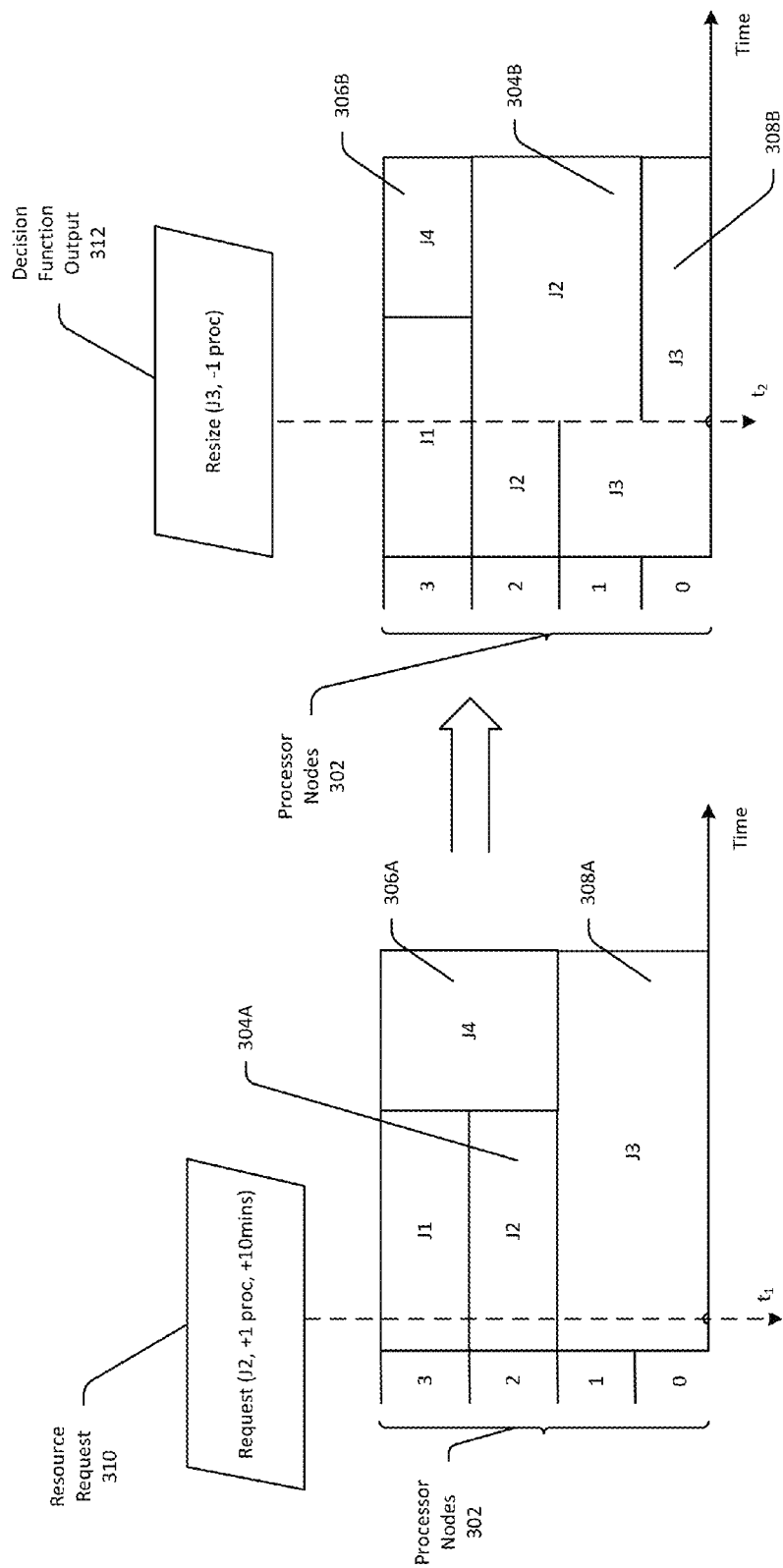
FIG. 3 schematically depicts resizing of a second executing job to accommodate a request for additional resources to execute a first executing job in accordance with one or more example embodiments of the disclosure.
Figure 7:
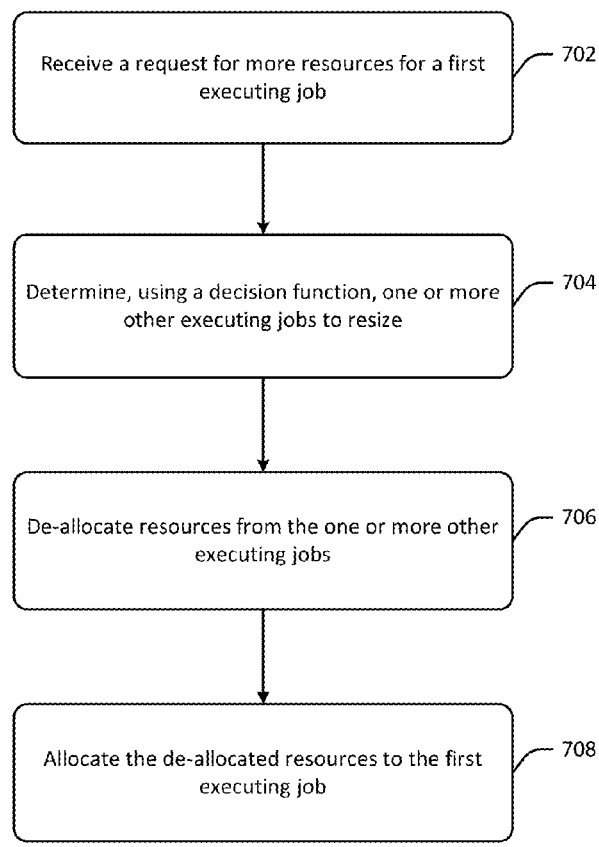
FIG. 7 is a process flow diagram of a method for receiving a request for additional resources to execute a first executing job and determining one or more other executing jobs to resize to accommodate the request for additional resources in accordance with one or more example embodiments of the disclosure.

FIG. 3 schematically depicts resizing of a second executing job to accommodate a request for additional resources to execute a first executing job in accordance with one or more example embodiments of the disclosure. FIG. 7 is a process flow diagram of an illustrative method 700 for receiving a request for additional resources to execute a first executing job and determining one or more other executing jobs to resize to accommodate the request for additional resources in accordance with one or more example embodiments of the disclosure. FIG. 3 will be described in conjunction with FIG. 7 hereinafter. While FIGS. 3 and 7 may be described in connection with resizing of an executing job, it should be appreciated that the discussion is also application to checkpointing of an executing job.

FIG. 3 depicts an initial allocation of processing nodes 302 for execution of jobs J1-J4 and a subsequent modified allocation of the processing nodes 302 to accommodate a resource request 310. As part of the initial allocation, prior to receipt of the resource request 310, job J3 may be in an execution state 308A in which job J3 is being executed on processing nodes 0 and 1. Further, job J2 may be in an execution state 304A in which job J2 is executing on processing node 2. In addition, job J4 may be associated with a future execution state 306A in which processing nodes 2 and 3 are allocated for executing job J4.

Referring now to FIGS. 3 and 7 in conjunction with one another, at block 702, the scheduler module 202 may receive the request 310 for additional computing resources for a first executing job at time $t_1$. In the example depicted in FIG. 3, the first executing job is job J2 and the additional computing resources being requested are an additional processing node and 10 minutes of additional execution time.

At block 704, the scheduler module 202 may determine, using a decision function, one or more other currently executing jobs to resize. An example decision function may be one that seeks to maximize throughput (e.g., the number of jobs executed within a time interval), or in other words, minimize the execution time of jobs since throughput is the inverse of execution time. In certain example embodiments, each job may have a corresponding deadline associated therewith that indicates a period of time in which execution of the job is to be completed. If a job deadline is violated, the scheduler module 202 does not consider the job for further resizing and prioritizes the job for completion.

Given a set of jobs $J=\{j_1, j_2, \ldots, j_n\}$ that are currently being executed on processing nodes (e.g., the processing nodes 302) under the control of the scheduler module 202, where $e_i$, $r_i$, and $d_i$ represent the estimated execution horizon, the current time, and the deadline for job $j_i$, respectively, then the decision function utilized to determine the one or more executing jobs to resize may be as follows. For each $j_i$ in $J-j_k$ (where $j_k$ is the job for which computing resources are being requested), if $j_i$ is eligible for resizing, the estimated execution horizon after resizing ($e_i'$) is computed. If $e_i'>d_i$, then the deadline associated with job $j_i$ is violated by resizing and the decision function selects a next job from the set of candidate jobs. If $e_i' \le d_i$, then the remaining execution time for job $j_i$ ($t_i$) is computed, where $t_i=e_i-r_i$. The remaining execution time for job $j_i$ after resizing ($t_i'$) is then computed, where $t_i'=e_i'-r_i$. The jobs may then be sorted in increasing order of $t_i'-t_i$ and iterated through to resize one or more jobs until a sufficient amount of computing resources are freed up to satisfy the resource request 310.

In particular, the scheduler module 202 may generate a decision function output 312 and communicate the output 312 to the dispatcher module 206 to cause, at block 706, computing resources to be de-allocated from the one or more other executing jobs (e.g., one or more candidate jobs that are selected in increasing order of $t_i'-t_i$) and allocated, at block 708, to the first executing job. In the example shown in FIG. 3, in response to the resource request 310, job J3 may be resized by de-allocating processing node 1 from job J3 at time $t_2$ (e.g., ceasing execution of J3 on processing node 1 at time t2). From time $t_2$ until execution completion, job J3 may be in an execution state 308B in which job J3 executed only on processing node 0. In addition, processing node 1 that has now been made available may initiate execution of a portion of job J2 at time $t_2$ such that from time $t_2$ until execution completion, job J2 is in an execution state 304B in which job J2 is executing on both processing node 1 and processing node 2. Further, job J2 may be executed on processing nodes 1 and 2 for a longer period of time to accommodate the request for additional execution time. Moreover, job J4 (which is initially scheduled for execution on processing nodes 2 and 3) may be rescheduled to a future execution state 306B in which job J4 is executed only on processing node 3. Alternatively, the scheduler module 202 may allocate processing node 3 for execution of a different job than job J4.

It should be noted that a conventional scheduler would not be able to accommodate the request for additional computing resources for job J2. Instead, in a conventional scheduling scenario, a user would be required to kill job J2 and reschedule it with more processing resources and execution time. The conventional resource manager would then determine when rescheduled job J2 would be executed, which could potentially result in significant delays in execution of job J2 if higher priority jobs are awaiting execution in the job queue.

FIG. 4A schematically depicts delayed execution of a scheduled job to accommodate a request to execute a new high-priority job. An initial allocation of processing nodes 402 for execution of jobs J1-J4 is shown in FIG. 4A. As part of the initial allocation, prior to receipt of a resource request 406 associated with a new job to be executed, job J4 may be associated with a future execution state 404A in which processing nodes 2 and 3 are allocated for executing job J4.

The resource request 406 may be received at time t1. The resource request 406 may be a request to execute a new high-priority job J5 and may indicate requested resources (e.g., a number of processing node(s) and an amount of execution time requested for job J5). In the conventional scenario depicted in FIG. 4A, the resource request 406 may only be accommodated after free computing resources become available at time $t_2$. For instance, all currently executing jobs may be permitted to continue execution without preemption, and job J5 may only enter execution state 408 and begin execution on processing node 2 upon completion of execution of J2 on processing node 2. In this example, job J5 may be determined to have a higher priority than job J4, and thus, execution of job J4 may be delayed until a future time. That is, job J4 may become associated with a future execution state 404B that is later in time than execution state 404A and that includes an allocation of different processing nodes (e.g., processing nodes 0 and 1 instead of processing nodes 2 and 3).

FIG. 4B schematically depicts preemption of a currently executing job using checkpointing in order to accommodate a request to execute a new high-priority job. A conventional resource manager may utilize preemption as shown in FIG. 4B to accommodate a request to execute a new, high-priority job in lieu of the non-preemptive approach depicted in FIG. 4A. The same initial allocation of processing nodes 402 for execution of jobs J1-J4 depicted in FIG. 4A is also shown in FIG. 4B. As part of the initial allocation, prior to receipt of a resource request 414 associated with a new job J5 to be executed, job J4 may be associated with a future execution state 412A in which processing nodes 2 and 3 are allocated for executing job J4 and job J2 may be associated with a current execution state 410A in which job J2 is executing on processing node 2.

The resource request 414 may be received at time t1. The resource request 414 may be a request to execute a new high-priority job J5 and may indicate requested resources (e.g., a number of processing node(s) and an amount of execution time requested for job J5). In the conventional preemption scenario depicted in FIG. 4B, the resource request 406 may be accommodated by preempting job J2 at time $t_2$. In particular, job J2 may be checkpointed at time $t_2$. More specifically, job J2 may be halted at time $t_2$ and resumed on a different processing node (e.g., node 3) at a later point in time (e.g., after job J1 completes execution on processing node 3) as part of future execution state 410B. Halting execution of job J2 at time $t_2$ frees up processing node 2 to be used to initiate execution of job J5 as part of execution state 416. Execution of job J4 may then be delayed to future execution state 412B, at which point, both processing node 2 and processing node 3 are available.

Figure 5:
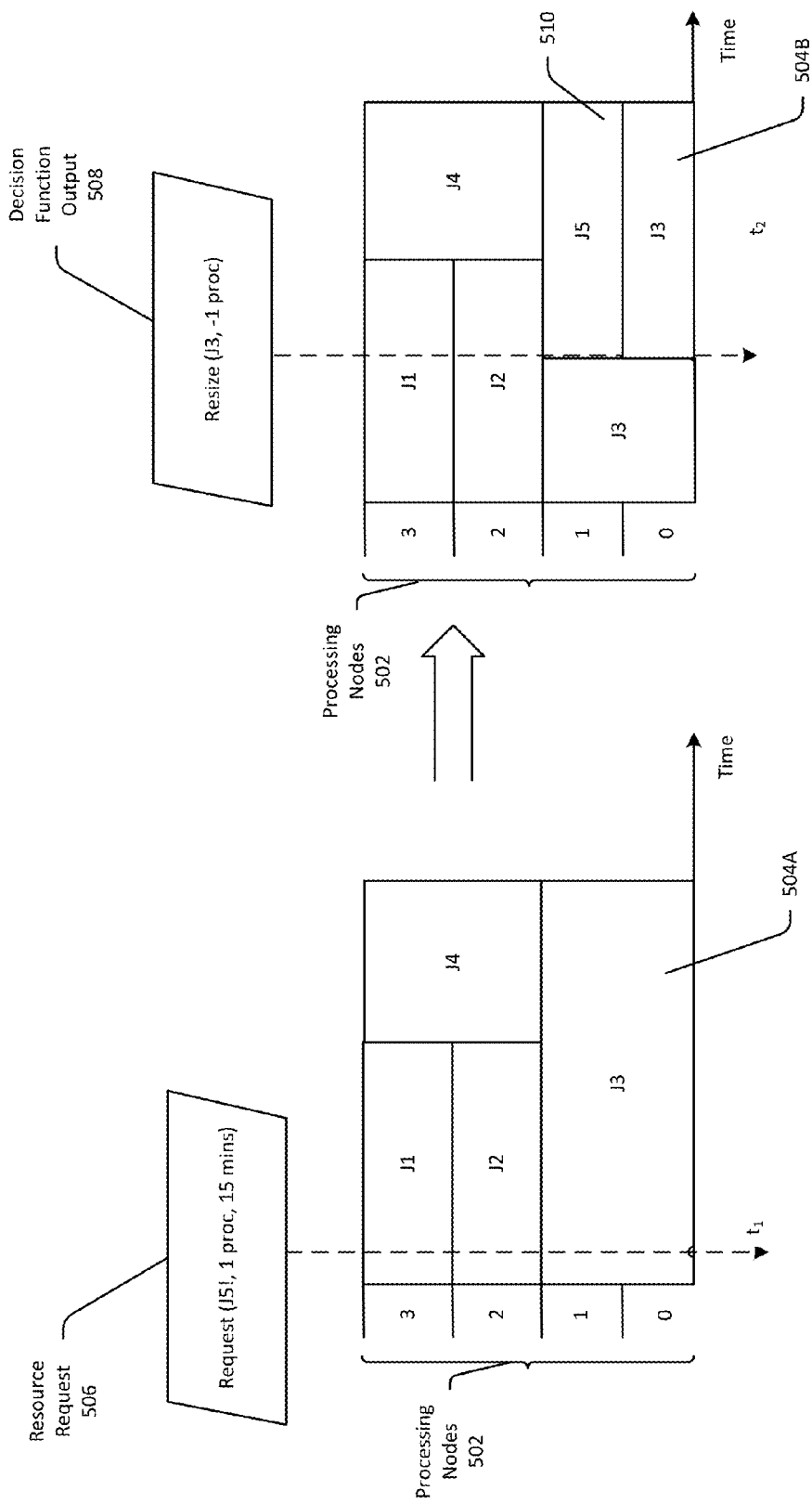
FIG. 5 schematically depicts resizing of a second executing job to accommodate a request to execute a new high-priority job in accordance with one or more example embodiments of the disclosure.
Figure 8:
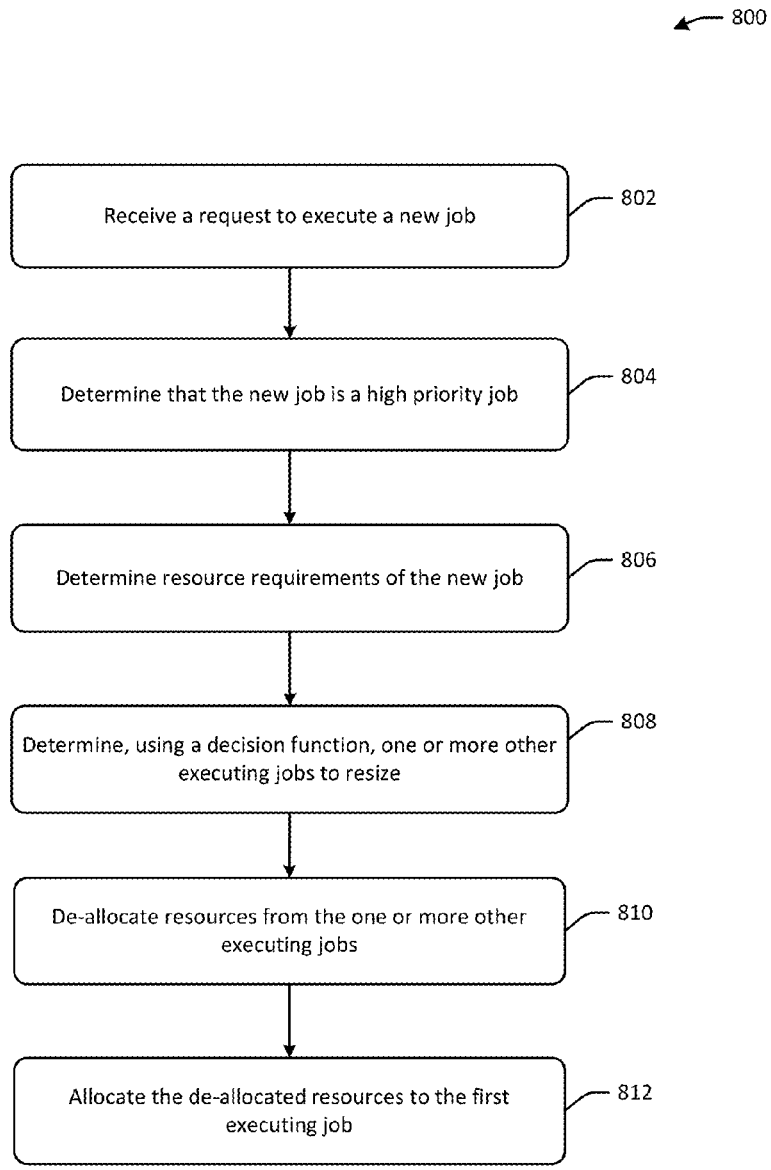
FIG. 8 is a process flow diagram of a method for receiving a request to execute a new high-priority job and determining one or more executing jobs to resize to accommodate execution of the new high-priority job in accordance with one or more example embodiments of the disclosure.

FIG. 5 schematically depicts resizing of a second executing job to accommodate a new high-priority job in accordance with one or more example embodiments of the disclosure. The resizing technique depicted in FIG. 5 can be implemented by the job execution scheduling system 200 as an alternative to the techniques of FIGS. 4A-4B that may be implemented by conventional resource managers. FIG. 8 is a process flow diagram of a method 800 for receiving a request to execute a new high-priority job and determining one or more executing jobs to resize to accommodate execution of the new high-priority job in accordance with one or more example embodiments of the disclosure. FIG. 5 will be described in conjunction with FIG. 8 hereinafter.

FIG. 5 depicts an initial allocation of processing nodes 502 for execution of jobs J1-J4 and a subsequent modified allocation of the processing nodes 502 to accommodate a resource request 506 associated with a new job to be executed. As part of the initial allocation, prior to receipt of the resource request 506, job J3 may be in an execution state 504A in which job J3 is being executed on processing nodes 0 and 1.

Referring now to FIGS. 5 and 8 in conjunction with one another, at block 802, the scheduler module 202 may receive, at time $t_1$, the request 506 to execute a new job. The resource request 506 may specify a number of processing node(s) being requested and an amount of execution time being requested. In the example depicted in FIG. 5, the new job is job J5 and the resources being requested are a processing node and 15 minutes of execution time.

At block 804, the scheduler module 202 may determine that the new job is a high-priority job. For example, scheduler module 202 may determine that a priority associated with the new job is higher than a respective priority associated with each of one or more currently executing jobs. At block 806, the scheduler module 202 may determine the resource requirements of the new job. For example, in the example depicted in FIG. 5, the scheduler module 202 may determine the resource requirements from the resource request 506.

At block 808, the scheduler module 202 may determine, using a decision function, one or more other currently executing jobs to resize. The example decision function described earlier, or any other suitable decision function, may be used. In certain example embodiments, the one or more other executing jobs selected for resizing may each have a lower execution priority than the new job (e.g., job J5).

At block 810, the scheduler module 202 may generate a decision function output 508 and communicate the output 508 to the dispatcher module 206 to cause computing resources to be de-allocated from the one or more other executing jobs selected for resizing, and allocated, at block 812, to the new job. In the example shown in FIG. 5, in response to the resource request 506, job J3 may be resized by de-allocating processing node 1 from job J3 at time $t_2$ (e.g., ceasing execution of J3 on processing node 1 at time $t_2$). As such, from time $t_2$ until execution completion, job J3 may be in an execution state 504B in which job J3 executed only on processing node 0. In addition, processing node 1 that has now been made available may initiate execution of a portion of job J5 at time $t_2$ such that from time $t_2$ until execution completion, job J5 is in an execution state 510 in which job J5 is executing on processing node 1. In the example shown in FIG. 5, job J5 is accommodated by resizing job J3 and without having to resize jobs J1, J2, or J4. The technique for accommodating job J5 depicted in FIG. 5 eliminates the drawback of delayed execution of job J4 in the non-preemptive scenario of FIG. 4A and the delayed execution of jobs J2 and J4 in the preemptive scenario of FIG. 4B.

Example embodiments of the disclosure include or yield various technical features, technical effects, and/or improvements to technology. For instance, example embodiments of the disclosure provide the technical effect of accommodating a request for additional computing resources from a currently executing job and/or a request to execute a high-priority job without having to wait until another currently executing job is completed and without having to preempt execution of another currently executing job. This technical effect is achieved as a result of the technical features of selecting one or more currently executing jobs to resize using a decision function and resizing the selected job(s) to enable accommodation of the received request while, at the same time, continuing execution of the selected job(s) using a reduced set of computing resources, and thus, ensuring a high degree of utilization of processing nodes. In addition, by virtue of the technical features noted above, example embodiments of the disclosure also provide the technical effect of being above to resize processes of a tightly coupled application to an arbitrary number of processing nodes, which a conventional resource manager is incapable of. Thus, example embodiments of the disclosure provide the technical effect of enabling dynamic accommodation of both tightly coupled and loosely coupled applications on the same processing infrastructure. As a result of the aforementioned technical features and technical effects, example embodiments of the disclosure constitute an improvement to existing computing resource management technology. It should be appreciated that the above examples of technical features, technical effects, and improvements to technology of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

Figure 9:
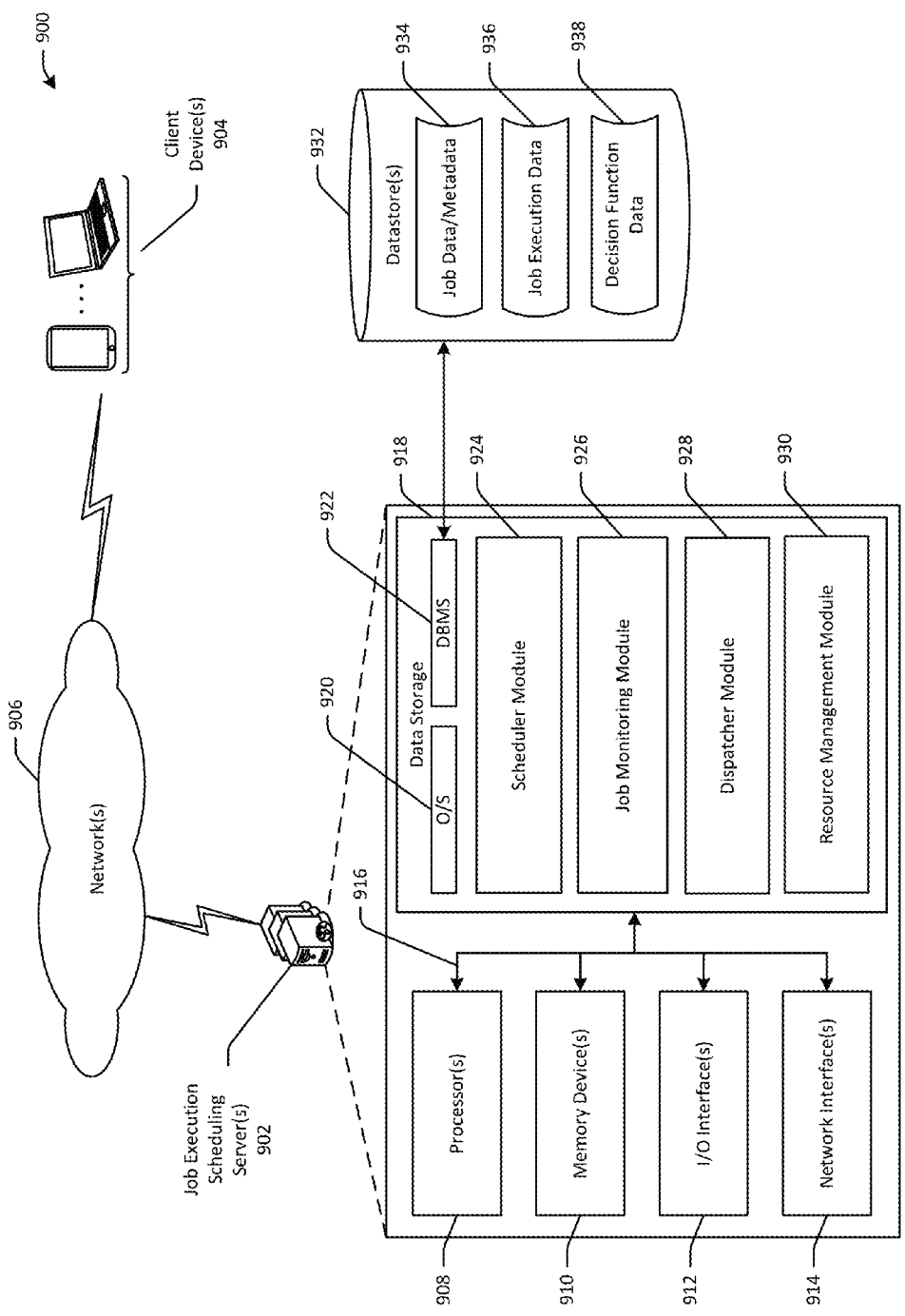
FIG. 9 is a schematic diagram of an illustrative networked architecture in accordance with one or more example embodiments of the disclosure.

FIG. 9 is a schematic diagram of an illustrative networked architecture 900 in accordance with one or more example embodiments of the disclosure. The networked architecture 900 may include one or more job execution scheduling servers 902 communicatively coupled to one or more client devices 904 via one or more networks 906. The job execution scheduling server(s) 902 may form part of the job execution scheduling system 200 such that any of the modules depicted in FIG. 2 may reside on one or more of the server(s) 902. While the job execution scheduling server 902 may be described herein in the singular, it should be appreciated that multiple instances of the job execution scheduling server 902 may be provided, and functionality described in connection with the job execution scheduling server 902 may be distributed across such multiple instances.

In an illustrative configuration, the job execution scheduling server 902 may include one or more processors (processor(s)) 908, one or more memory devices 910 (generically referred to herein as memory 910), one or more input/output ("I/O") interface(s) 912, one or more network interfaces 914, and data storage 918. The may further include one or more buses 916 that functionally couple various components of the job execution scheduling server 902.

The bus(es) 916 may include at least one of a system bus, a memory bus, an address bus, or a message bus, and may permit exchange of information (e.g., data (including computer-executable code), signaling, etc.) between various components of the job execution scheduling server 902. The bus(es) 916 may include, without limitation, a memory bus or a memory controller, a peripheral bus, an accelerated graphics port, and so forth. The bus(es) 916 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 910 of the job execution scheduling server 902 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 910 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 910 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 918 may include removable storage and/or non-removable storage including, but not limited to, magnetic storage, optical disk storage, and/or tape storage. The data storage 918 may provide non-volatile storage of computer-executable instructions and other data. The memory 910 and the data storage 918, removable and/or non-removable, are examples of computer-readable storage media (CRSM) as that term is used herein.

The data storage 918 may store computer-executable code, instructions, or the like that may be loadable into the memory 910 and executable by the processor(s) 908 to cause the processor(s) 908 to perform or initiate various operations. The data storage 918 may additionally store data that may be copied to memory 910 for use by the processor(s) 908 during the execution of the computer-executable instructions. Moreover, output data generated as a result of execution of the computer-executable instructions by the processor(s) 908 may be stored initially in memory 910, and may ultimately be copied to data storage 918 for non-volatile storage.

More specifically, the data storage 918 may store one or more operating systems (O/S) 920; one or more database management systems (DBMS) 922 configured to access the memory 910 and/or one or more datastores 932; and one or more program modules, applications, engines, computer-executable code, scripts, or the like such as, for example, a scheduler module 924, a job monitoring module 926, a dispatcher module 928, and a resource management module 930. Any of the components depicted as being stored in data storage 918 may include any combination of software, firmware, and/or hardware. The software and/or firmware may include computer-executable code, instructions, or the like that may be loaded into the memory 910 for execution by one or more of the processor(s) 908 to perform any of the operations described earlier in connection with correspondingly named modules.

Although not depicted in FIG. 9, the data storage 918 may further store various types of data utilized by components of the job execution scheduling server 902 (e.g., any of the data depicted as being stored in the datastore(s) 932). Any data stored in the data storage 918 may be loaded into the memory 910 for use by the processor(s) 908 in executing computer-executable code. In addition, any data depicted as being stored in the data storage 918 may potentially be stored in one or more of the datastore(s) 932 and may be accessed via the DBMS 922 and loaded in the memory 910 for use by the processor(s) 908 in executing computer-executable instructions, code, or the like.

The processor(s) 908 may be configured to access the memory 910 and execute computer-executable instructions loaded therein. For example, the processor(s) 908 may be configured to execute computer-executable instructions of the various program modules, applications, engines, or the like of the job execution scheduling server 902 to cause or facilitate various operations to be performed in accordance with one or more embodiments of the disclosure. The processor(s) 908 may include any suitable processing unit capable of accepting data as input, processing the input data in accordance with stored computer-executable instructions, and generating output data. The processor(s) 908 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 908 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 908 may be capable of supporting any of a variety of instruction sets.

Referring now to other illustrative components depicted as being stored in the data storage 918, the O/S 920 may be loaded from the data storage 918 into the memory 910 and may provide an interface between other application software executing on the job execution scheduling server 902 and hardware resources of the job execution scheduling server 902. More specifically, the O/S 920 may include a set of computer-executable instructions for managing hardware resources of the job execution scheduling server 902 and for providing common services to other application programs (e.g., managing memory allocation among various application programs). In certain example embodiments, the O/S 920 may control execution of one or more of the program modules depicted as being stored in the data storage 918. The O/S 920 may include any operating system now known or which may be developed in the future including, but not limited to, any server operating system, any mainframe operating system, or any other proprietary or non-proprietary operating system.

The DBMS 922 may be loaded into the memory 910 and may support functionality for accessing, retrieving, storing, and/or manipulating data stored in the memory 910, data stored in the data storage 918, and/or data stored in the datastore(s) 932. The DBMS 922 may use any of a variety of database models (e.g., relational model, object model, etc.) and may support any of a variety of query languages. The DBMS 922 may access data represented in one or more data schemas and stored in any suitable data repository.

The datastore(s) 932 may include, but are not limited to, databases (e.g., relational, object-oriented, etc.), file systems, flat files, distributed datastores in which data is stored on more than one node of a computer network, peer-to-peer network datastores, or the like. The datastore(s) 932 may store various types of data including, without limitation, job data/metadata 934, job execution data 936, and decision function data 938. The job data/metadata 934 may include, without limitation, data indicative of a set of jobs, a corresponding job state for each job (e.g., currently executing, completed, or awaiting execution in a job queue), and resource requirements for each job. The job execution data 936 may include, without limitation, data indicative of the current set of computing resources being used to execute each currently executing job, data indicative of the set of computing resources allocated for future execution of queued jobs, data indicative of modifications to computing resource allocations based on resizing of one or more executing jobs, or the like. The decision function data 938 may include, without limitation, data indicative of various decision functions that may be used to sort and select jobs for resizing or checkpointing. It should be appreciated that, in certain example embodiments, any of the datastore(s) 932 and/or any of the data depicted as residing thereon may additionally, or alternatively, be stored locally in the data storage 918.

Referring now to other illustrative components of the job execution scheduling server 902, the input/output (I/O) interface(s) 912 may facilitate the receipt of input information by the job execution scheduling server 902 from one or more I/O devices as well as the output of information from the job execution scheduling server 902 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the job execution scheduling server 902 or may be separate. The I/O devices may further include, for example, any number of peripheral devices such as data storage devices, printing devices, and so forth.

The I/O interface(s) 912 may also include an interface for an external peripheral device connection such as universal serial bus (USB), FireWire, Thunderbolt, Ethernet port or other connection protocol that may connect to one or more networks. The I/O interface(s) 912 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The job execution scheduling server 902 may further include one or more network interfaces 914 via which the job execution scheduling server 902 may communicate with any of a variety of other systems, platforms, networks, devices, and so forth. The network interface(s) 914 may enable communication, for example, with one or more other devices via one or more of the network(s) 906. The network(s) 906 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 906 may have any suitable communication range associated therewith and may include, for example, global networks (e.g., the Internet), metropolitan area networks (MANs), wide area networks (WANs), local area networks (LANs), or personal area networks (PANs). In addition, the network(s) 906 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the modules depicted in FIG. 9 as being stored in the data storage 918 (or depicted in FIG. 2 more generally as part of the job execution scheduling system 200) are merely illustrative and not exhaustive and that processing described as being supported by any particular engine or module may alternatively be distributed across multiple engines, modules, or the like, or performed by a different engine, module, or the like. In addition, various program module(s), script(s), plug-in(s), Application Programming Interface(s) (API(s)), or any other suitable computer-executable code hosted locally on the Job execution scheduling server 902 and/or hosted on other computing device(s) accessible via one or more of the network(s) 906, may be provided to support functionality provided by the modules depicted in FIGS. 2 and 9 and/or additional or alternate functionality. Further, functionality may be modularized differently such that processing described as being supported collectively by the collection of modules depicted in FIGS. 2 and 9 may be performed by a fewer or greater number of program modules, or functionality described as being supported by any particular module may be supported, at least in part, by another program module. In addition, program modules that support the functionality described herein may form part of one or more applications executable across any number of job execution scheduling servers 902 in accordance with any suitable computing model such as, for example, a client-server model, a peer-to-peer model, and so forth. In addition, any of the functionality described as being supported by any of the modules depicted in FIGS. 2 and 9 may be implemented, at least partially, in hardware and/or firmware across any number of devices.

It should further be appreciated that the job execution scheduling server 902 may include alternate and/or additional hardware, software, or firmware components beyond those described or depicted without departing from the scope of the disclosure. More particularly, it should be appreciated that software, firmware, or hardware components depicted as forming part of the job execution scheduling server 902 are merely illustrative and that some components may not be present or additional components may be provided in various embodiments. While various illustrative modules have been depicted and described as software modules stored in data storage 918, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted or described as sub-modules of another module, in certain embodiments, such modules may be provided as independent modules or as sub-modules of other modules.

One or more operations of the methods 600-800 may be performed by a job execution scheduling system 200 that includes one or more job execution scheduling servers 902 having the illustrative configuration depicted in FIG. 9, or more specifically, by one or more program modules, engines, applications, or the like executable on such device(s). It should be appreciated, however, that such operations may be implemented in connection with numerous other system configurations.

The operations described and depicted in the illustrative methods of FIGS. 6-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 6-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method executed by a scheduling system comprising one or more computer processors for scheduling execution of parallel or distributed applications, the method comprising:
   receiving a request to allocate at least one computing resource of a plurality of computing resources for execution of a first executable application;
   determining that a second executable application and a third executable application are each eligible for resizing to accommodate the request to allocate the at least one computing resource, wherein at least a first portion and a second portion of the second executable application are respectively executing on a first computing resource and a second computing resource of the plurality of computing resources;
   selecting the second executable application to resize based at least in part on determining that a respective difference between a remaining execution time prior to resizing and a remaining execution time after resizing is smaller for the second executable application than for the third executable application;
   causing the second executable application to be resized at least in part by sending a first signal to the first computing resource to cease execution of the first portion of the second executable application on the first computing resource, wherein execution of at least the second portion of the second executable application continues on the second computing resource after resizing; and
   sending a second signal to the first computing resource to initiate execution of at least a portion of the first executable application on the first computing resource.

2. The method of claim 1, wherein the at least a portion of the first executable application is a first portion of the first executable application, the method further comprising:
   determining that a second portion of the first executable application is currently executing on a third computing resource of the plurality of computing resources; and
   allocating, in response to receiving the request to allocate the at least one computing resource, additional time for the second portion of the first executable application to execute on the third computing resource.

3. The method of claim 1, further comprising:
   determining that the first executable application is not currently executing on any computing resource of the plurality of computing resources; and
   determining that the first executable application is associated with a first priority that is higher than a second priority associated with the second executable application.

4. The method of claim 1, wherein the at least one computing resource is a first at least one computing resource, the method further comprising:
   receiving a request to allocate a second at least one computing resource of the plurality of computing resources for execution of a third executable application;
   determining that the third executable application is associated with a first priority that is higher than a second priority associated with a fourth executable application;
   selecting the fourth executable application for checkpointing to accommodate the request to allocate the second at least one computing resource, wherein at least a portion of the fourth executable application is currently executing on a third computing resource of the plurality of computing resources; and
   causing the fourth executable application to be checkpointed at least in part by:
      sending a first signal to the third computing resource to cease execution of the at least a portion of the fourth executable application on the third computing resource during a first period of time;
      sending a second signal to the third computing resource to initiate execution of at least a portion of the third executable application on the third computing resource; and
      sending a signal to a fourth computing resource of the plurality of computing resources to initiate, during a second period of time after the first period of time, execution of the at least a portion of the fourth executable application from a point at which execution ceased on the third computing resource.

5. The method of claim 1, wherein the at least a portion of the first executable application is a first portion, the method further comprising:
   determining that a third computing resource and a fourth computing resource are allocated for execution of a third executable application;
   allocating the third computing resource for execution of a second portion of the first executable application instead of the third executable application; and
   scheduling the third executable application or a fourth executable application that is different from the third executable application for execution on the third computing resource after execution of the second portion of the first executable application completes.

6. A system for scheduling execution of parallel or distributed applications, the system comprising:
   at least one memory storing computer-executable instructions; and at least one processor configured to access the at least one memory and execute the computer-executable instructions to:
receive a request to allocate at least one computing resource of a plurality of computing resources for execution of a first executable application;
determine that a second executable application and a third executable application are each eligible for resizing to accommodate the request to allocate the at least one computing resource, wherein at least a first portion and a second portion of the second executable application are respectively executing on a first computing resource and a second computing resource of the plurality of computing resources;
select the second executable application to resize to accommodate the request based at least in part on determining that a respective difference between a remaining execution time prior to resizing and a remaining execution time after resizing is smaller for the second executable application than for the third executable application;
cause the second executable application to be resized at least in part by sending a first signal to the first computing resource to cease execution of the first portion of the second executable application on the first computing resource, wherein execution of at least the second portion of the second executable application continues on the second computing resource after resizing; and
send a second signal to the first computing resource to initiate execution of at least a portion of the first executable application on the first computing resource.

7. The system of claim 6, wherein the at least a portion of the first executable application is a first portion of the first executable application, and wherein the at least one processor is further configured to executable the computer-executable instructions to:
determine that a second portion of the first executable application is currently executing on a third computing resource of the plurality of computing resources; and
allocate, in response to receiving the request to allocate the at least one computing resource, additional time for the second portion of the first executable application to execute on the third computing resource.

8. The system of claim 6, wherein the at least one processor is further configured to executable the computer-executable instructions to:
determine that the first executable application is not currently executing on any computing resource of the plurality of computing resources; and
determine that the first executable application is associated with a first priority that is higher than a second priority associated with the second executable application.

9. The system of claim 6, wherein the at least one computing resource is a first at least one computing resource, and wherein the at least one processor is further configured to executable the computer-executable instructions to:
receive a request to allocate a second at least one computing resource of the plurality of computing resources for execution of a third executable application;
determine that the third executable application is associated with a first priority that is higher than a second priority associated with a fourth executable application;
select the fourth executable application for checkpointing to accommodate the request to allocate the second at least one computing resource, wherein at least a portion of the fourth executable application is currently executing on a third computing resource of the plurality of computing resources; and
cause the fourth executable application to be checkpointed at least in part by:
sending a first signal to the third computing resource to cease execution of the at least a portion of the fourth executable application on the third computing resource during a first period of time;
sending a second signal to the third computing resource to initiate execution of at least a portion of the first third executable application on the third computing resource; and
sending a signal to a fourth computing resource of the plurality of computing resources to initiate, during a second period of time after the first period of time, execution of the at least a portion of the fourth executable application from a point at which execution ceased on the third computing resource.

10. The system of claim 6, wherein the at least a portion of the first executable application is a first portion, and wherein the at least one processor is further configured to executable the computer-executable instructions to:
determine that a third computing resource and a fourth computing resource are allocated for execution of a third executable application;
allocate the third computing resource for execution of a second portion of the first executable application instead of the third executable application; and
schedule the third executable application or a fourth executable application that is different from the third executable application for execution on the third computing resource after execution of the second portion of the first executable application completes.

11. A computer program product for scheduling execution of parallel or distributed applications, the computer program product comprising a non-transitory storage medium readable by a processing circuit, the storage medium storing instructions executable by the processing circuit to cause a method to be performed, the method comprising:
receiving a request to allocate at least one computing resource of a plurality of computing resources for execution of a first executable application;
determining that a second executable application and a third executable application are each eligible for resizing to accommodate the request to allocate the at least one computing resource, wherein at least a first portion and a second portion of the second executable application are respectively executing on a first computing resource and a second computing resource of the plurality of computing resources;
selecting the second executable application to resize based at least in part on determining that a respective difference between a remaining execution time prior to resizing and a remaining execution time after resizing is smaller for the second executable application than for the third executable application;
causing the second executable application to be resized at least in part by sending a first signal to the first computing resource to cease execution of the first portion of the second executable application on the first computing resource, wherein execution of at least the second portion of the second executable application continues on the second computing resource after resizing; and sending a second signal to the first computing resource to initiate execution of at least a portion of the first executable application on the first computing resource.

12. The computer program product of claim 11, wherein the at least a portion of the first executable application is a first portion of the first executable application, the method further comprising:

determining that a second portion of the first executable application is currently executing on a third computing resource of the plurality of computing resources; and allocating, in response to receiving the request to allocate the at least one computing resource, additional time for the second portion of the first executable application to execute on the third computing resource.

13. The computer program product of claim 11, the method further comprising:

determining that the first executable application is not currently executing on any computing resource of the plurality of computing resources; and determining that the first executable application is associated with a first priority that is higher than a second priority associated with the second executable application.

14. The computer program product of claim 11, wherein the at least one computing resource is a first at least one computing resource, the method further comprising:

receiving a request to allocate a second at least one computing resource of the plurality of computing resources for execution of a third executable application;

determining that the third executable application is associated with a first priority that is higher than a second priority associated with a fourth executable application;

selecting the fourth executable application for checkpointing to accommodate the request to allocate the second at least one computing resource, wherein at least a portion of the fourth executable application is currently executing on a third computing resource of the plurality of computing resources; and causing the fourth executable application to be checkpointed at least in part by:

sending a first signal to the third computing resource to cease execution of the at least a portion of the fourth executable application on the third computing resource during a first period of time;

sending a second signal to the third computing resource to initiate execution of at least a portion of the third executable application on the third computing resource; and sending a signal to a fourth computing resource of the plurality of computing resources to initiate, during a second period of time after the first period of time, execution of the at least a portion of the fourth executable application from a point at which execution ceased on the third computing resource.

15. The computer program product of claim 11, wherein the at least a portion of the first executable application is a first portion, the method further comprising:

determining that a third computing resource and a fourth computing resource are allocated for execution of a third executable application;

allocating the third computing resource for execution of a second portion of the first executable application instead of the third executable application; and scheduling the third executable application or a fourth executable application that is different from the third executable application for execution on the third computing resource after execution of the second portion of the first executable application completes.

* * * * *